United States Patent
Srivastava et al.

(10) Patent No.: US 11,036,964 B2
(45) Date of Patent: Jun. 15, 2021

(54) METHOD AND SYSTEM FOR ITEM IDENTIFICATION

(71) Applicant: Mashgin Inc., Palo Alto, CA (US)

(72) Inventors: Abhinai Srivastava, Palo Alto, CA (US); Mukul Dhankhar, Palo Alto, CA (US)

(73) Assignee: Mashgin Inc., Palo Alto, CA (US)

(*) Notice: Subject to any disclaimer, the term of this patent is extended or adjusted under 35 U.S.C. 154(b) by 0 days.

(21) Appl. No.: 17/079,056

(22) Filed: Oct. 23, 2020

(65) Prior Publication Data
US 2021/0124906 A1   Apr. 29, 2021

Related U.S. Application Data

(60) Provisional application No. 62/926,296, filed on Oct. 25, 2019.

(51) Int. Cl.
*G06K 9/00* (2006.01)
*G06K 9/62* (2006.01)
*G06N 3/08* (2006.01)
*G06T 3/40* (2006.01)
(Continued)

(52) U.S. Cl.
CPC ....... *G06K 9/00201* (2013.01); *G06K 9/6215* (2013.01); *G06N 3/08* (2013.01); *G06T 3/0068* (2013.01); *G06T 3/40* (2013.01); *G06T 9/20* (2013.01)

(58) Field of Classification Search
CPC ........ G06N 20/00; G06N 20/10; G06N 20/20; G06N 3/08; G06T 7/20; G06T 7/74; G06T 7/246; G06T 7/277; G06T 7/75; G06T 7/251; G06T 7/248; G06T 7/759; G06T 7/50; G06T 5/005; G06T 5/50; G06T 7/0069; G06T 7/751; G06T 3/0068; G06T 3/40; G06T 9/20; G06K 9/6267; G06K 9/3233; G06K 9/66; G06K 9/00335; G06K 9/00664; G06K 9/4628; G06K 9/6274; G06K 9/00201; G06K 9/6215; H04N 13/117; H04N 19/553; H04N 13/00; H04N 19/00
See application file for complete search history.

(56) References Cited

U.S. PATENT DOCUMENTS 9,129,277 B2   9/2015   MacIntosh
10,776,856 B2   9/2020   Leifer et al.
(Continued)

FOREIGN PATENT DOCUMENTS

KR   20180060257 A   6/2018
WO   2008091281 A2   7/2008

OTHER PUBLICATIONS

Charpiat, Guillaume et al. "Input Similarity from the Neural Network Perspective" 33rd Conference on Neural Information Processing Systems, (NeurIPS 2019), Vancouver, Canada.

*Primary Examiner* — Duy M Dang
(74) *Attorney, Agent, or Firm* — Jeffrey Schox; Diana Lin

(57) ABSTRACT

The method for item identification preferably includes determining visual information for an item; calculating a first encoding using the visual information; calculating a second encoding using the first encoding; determining an item identifier for the item using the second encoding; optionally presenting information associated with the item to a user; and optionally registering a new item.

20 Claims, 8 Drawing Sheets

(51) Int. Cl.
 *G06T 3/00* (2006.01)
 *G06T 9/20* (2006.01)

(56) References Cited

U.S. PATENT DOCUMENTS

| | | | |
|---|---|---|---|
| 2015/0109451 A1* | 4/2015 | Dhankhar | G06Q 30/0641 |
| | | | 348/150 |
| 2019/0197466 A1* | 6/2019 | Hand, III | G06K 9/00624 |
| 2019/0215424 A1* | 7/2019 | Adato | G06F 16/5846 |
| 2019/0236362 A1* | 8/2019 | Srivastava | G06Q 20/208 |

\* cited by examiner

METHOD AND SYSTEM FOR ITEM IDENTIFICATION

CROSS-REFERENCE TO RELATED APPLICATIONS

This application claims the benefit of U.S. Provisional Application Ser. No. 62/926,296, filed on 25 Oct. 2019, which is incorporated in its entirety by this reference.

TECHNICAL FIELD

This invention relates generally to the computer vision field, and more specifically to a new and useful method for item identification.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
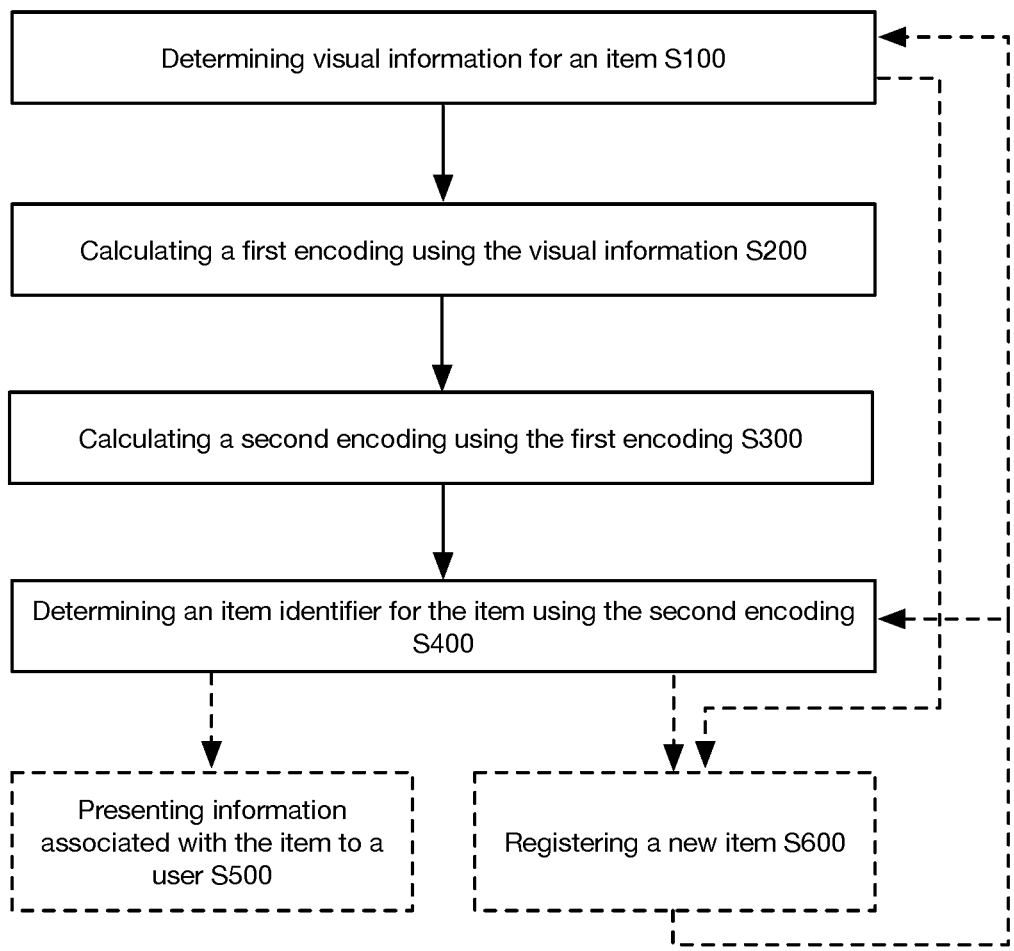
FIG. 1 is a schematic representation of the method.

As shown in FIG. 1, the method for item identification includes determining visual information for an item S100; calculating a first encoding using the visual information S200; calculating a second encoding using the first encoding S300; determining an item identifier for the item using the second encoding S400; optionally presenting information associated with the item to a user S500; and optionally registering a new item Shoo. However, the method can additionally or alternatively include any other suitable elements.

The method functions to identify items in real- or near-real time. The method can optionally enable reliable item addition and subsequent identification without model retraining.

2. Example

In a first example, the method can include: receiving a plurality of image segments for an item from a sampling system; determining first encodings for each of the plurality of image segments using an item classifier that was trained to identify the item based on an image segment; determining a second encoding for the item by providing the first encodings to a combination classifier that was trained to identify the item based on a set of first encodings; and determining an item identifier based on the second encoding (e.g., using a comparison module). The item identifier, and optionally associated item information, such as an item price, can be transmitted to a user device, sampling system, or any other suitable system. The item identifier can aid in completing a transaction (e.g., in S500) or serve any other suitable function. The item identifier can be stored in association with the item encoding vector (e.g., second encoding) in the item repository, and/or be stored in any other suitable location.

Figure 4:
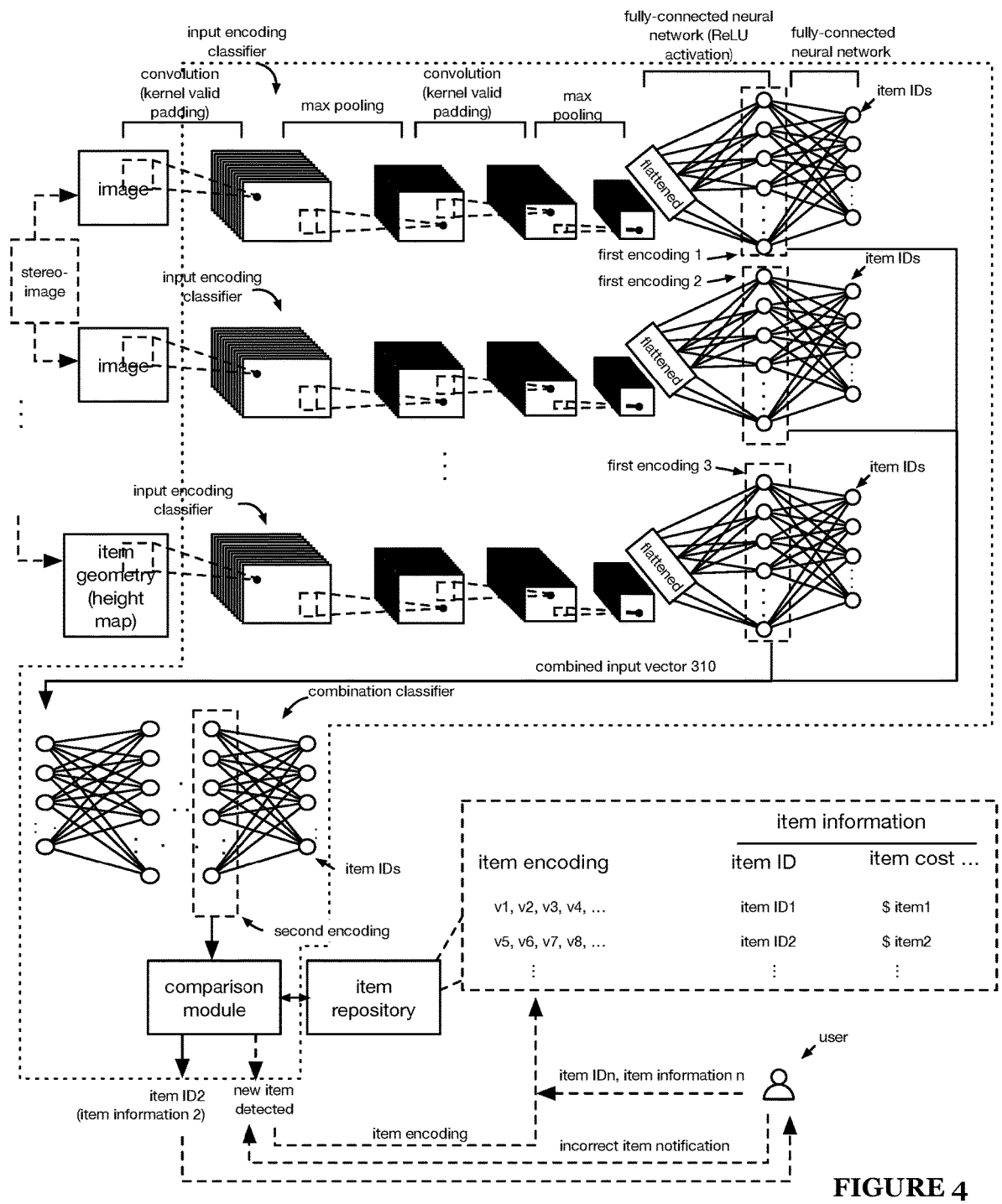
FIG. 4 depicts an embodiment of the method.

In this example, the method can additionally or alternatively recognize new items without retraining the item classifier or combination classifier. In this example, the method can include: detecting a new item event and storing the second encoding in the item repository in association with item information (e.g., SKU, item price, etc.). The new item's second encoding can subsequently be used as a reference by the comparison module for subsequent method instances. A specific example of the method is shown in FIG. 4.

3. Benefits

Variants of the method and system can confer benefits over conventional systems.

First, the inventors have discovered that an item can be accurately and quickly identified based on the item encoding extracted from the input encoding module that was trained to recognize the item from a set of images (e.g., from multiple cameras, from multiple viewpoints). In particular, the unknown item's encoding (e.g., extracted from an intermediate layer of the pre-trained classifier(s)) can be compared with a database of known item encodings to identify the unknown item. In variants, the unknown item's identifier is not directly determined by the input encoding module, but instead determined based on feature values extracted from an intermediate layer of the combination classifier. Thus, the item can be rapidly identified using the item encoding. Since the input encoding module reduces the dimensionality of the inputs from images to a single feature vector with a predetermined dimension, when the method determines the item identifier, the algorithm is very fast. This is because, ultimately, the method is determining the similarity (e.g., proximity, distance, etc.) of the unknown feature vector to the known feature vectors (e.g., pre-associated with item identifiers), which in turn enables the method to determine the associated item identifier for the unknown feature vector.

Second, in variants, pre-training the classifiers of the input encoding module not only on a plurality of views of an item, but also on the item's shape information, can yield a better encoding of the item. This in turn yields higher accuracy when using the item encoding to identify the item.

Third, in variants, the method improves the functionality of a computing system because the method can use less memory over conventional systems. First, less memory can be used to store each item's reference data. For example, conventional systems often determine an item identifier from an input image. This means that the item repository stores images of items associated with item identifier for operation. The inventors have discovered that if, instead of using images of items, they use representations of items, then the item repository only needs to store the representation associated with the input image, not the input image itself. For example, even if the input image is low resolution, 256×256 pixels with 3 color channels, yielding lower accuracy than higher resolution images, then the vector necessary to store a single image without compression has dimension 256×256×3 (i.e., 196,608 values) as opposed to a representation of the input image which can have a much smaller dimension (e.g., 100, 256, 512, 1024, etc.). Second, the modules (e.g., neural networks) that are used can be smaller (e.g., use less memory), since the modules only need to output unique encodings and no longer have to process those encodings to uniquely identify an item.

Fourth, variants of the method can perform well with no additional training or minimal training (e.g., zero-shot, one-shot, single-shot, etc.) to identify new items. This allows new items to be dynamically added and recognized at the edge (e.g., on a local system-by-system basis), without retraining, which can be computationally- and time-intensive. Unlike conventional systems that need to retrain neural networks on a plurality of images to recognize a new item, the inventors have discovered that the image representation (e.g., item encoding) of the new item, output by the pre-trained system, can be subsequently used to accurately identify the new item. This is because the method identifies items based on vector similarity (e.g., instead of relying on a SoftMax layer, which must be trained), and because the pre-trained network will deterministically output unique feature vectors (e.g., item encodings) for a given item, regardless of whether the pre-trained network was trained to recognize the item or not.

Fifth, the inventors have discovered that processing power can be further reduced by using transaction data, during operation, to register new items. Since the item will need to be processed during the transaction, this reduces any further processing the computing system would need to perform before the transaction to process the item. For example, when an item is processed during the transaction, the system will display an error and ask the operator (e.g., customer, employee, etc.) to associate the item with the item identifier. Additionally or alternatively, the operator can determine that the returned item identifier is incorrect and input a correct item identifier to associate with the item. During the transaction, the method will associate each transaction item with an item encoding vector (e.g., feature vector associated with an intermediate layer of a classifier) and an item identifier which can be stored as transaction log data. However, transaction log data can include any other suitable information. Then the transaction log data can additionally or alternatively be used to load the new item information into the item database for subsequent transactions.

However, variants of the method and system can confer any other suitable benefits and/or advantages.

4. System

The method is preferably performed using a system 20 (example shown in FIG. 2), including: a sampling system 200, a processing system 100, one or more repositories 420-480, and/or any other suitable components.

Figure 8:
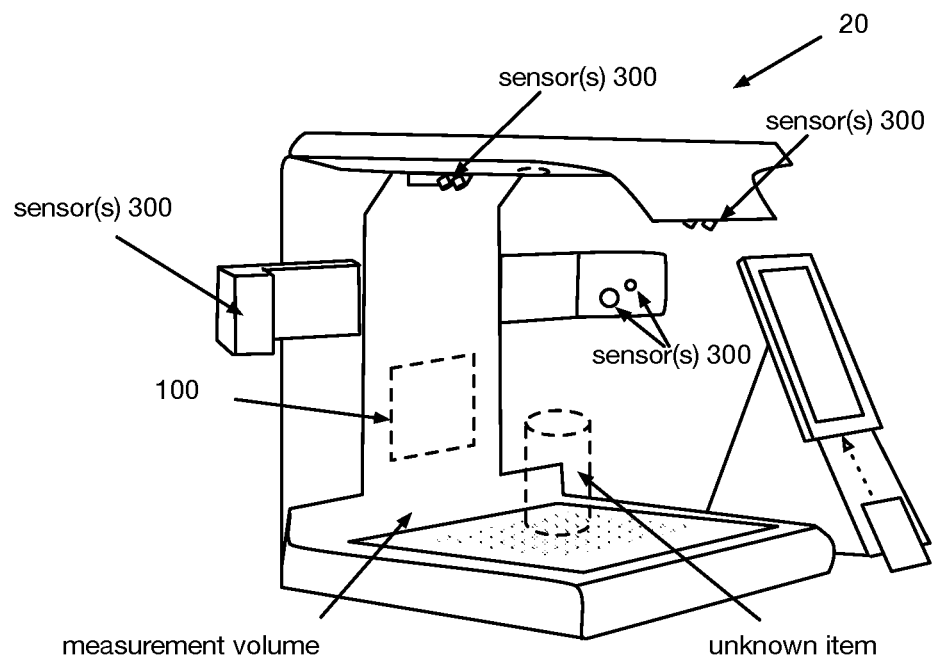
FIG. 8 depicts an example of the system.

The sampling system functions to sample images of the item. The sampling system can include: a housing defining a measurement volume, and a set of sensors 300 monitoring the measurement volume (example shown in FIG. 8). The sampling system is preferably located at the edge (e.g., onsite at a user facility), but can alternatively be located in another venue.

The housing of the sampling system functions to define the measurement volume (e.g., examination space), and can optionally retain the sensors in a predetermined configuration about the measurement volume. The housing can optionally define one or more item insertion regions (e.g., between housing walls, between housing arms, along the sides or top of the measurement volume, etc.). The housing can include: a base and one or more arms wherein the measurement volume is defined between the base and arm(s). The base is preferably static, but can alternatively be mobile (e.g., be a conveyor belt). The arms are preferably static, but can alternatively be actuatable. The arms can extend from the base (e.g., perpendicular to the base, at a non-zero angle to the base, etc.), extend from another arm (e.g., parallel the base, at an angle to the base, etc.), and/or be otherwise configured. The housing can optionally include a top, wherein the top can bound the vertical extent of the measurement volume and optionally control the optical characteristics of the measurement volume (e.g., by blocking ambient light, by supporting lighting systems, etc.). However, the housing can be otherwise configured.

The sensors of the sampling system function to sample measurements of the items within the measurement volume. The sensors are preferably mounted to the arms of the housing, but can alternatively be mounted to the housing sides, top, bottom, threshold (e.g., of the item insertion region), and/or any other suitable portion of the housing. The sensors are preferably arranged along one or more sides of the measurement volume, such that the sensors monitor one or more views of the measurement volume (e.g., left, right, front, back, top, bottom, corners, etc.). In a specific example, the sensors are arranged along at least the left, right, back, and top of the measurement volume. However, the sensors can be otherwise arranged.

The sampling system preferably includes multiple sensors, but can alternatively include a single sensor. The sensor(s) can include: imaging systems, weight sensors (e.g., arranged in the base), acoustic sensors, touch sensors, proximity sensors, and/or any other suitable sensor. The imaging system functions to output one or more images of the measurement volume (e.g., image of the items within the measurement volume), but can additionally or alternatively output 3D information (e.g., depth output, point cloud, etc.) and/or other information. The imaging system can be a stereocamera system (e.g., including a left and right stereocamera pair), a depth sensor (e.g., projected light sensor, structured light sensor, time of flight sensor, laser, etc.), a monocular camera (e.g., CCD, CMOS), and/or any other suitable imaging system.

In a specific example, the sampling system includes stereocamera systems mounted to at least the left, right, front, and back of the measurement volume, and optionally includes a top-mounted depth sensor. In a second specific example, the sampling system can be any of the systems disclosed in U.S. application Ser. No. 16/168,066 filed 23 Oct. 2018, U.S. application Ser. No. 16/923,674 filed 8 Jul. 2020, U.S. application Ser. No. 16/180,838 filed 5 Nov. 2018, and/or U.S. application Ser. No. 16/104,087 filed 16 Aug. 2018, each of which is incorporated herein in its entirety by this reference. However, the sampling system can be otherwise configured.

The processing system functions to process the visual information to determine the item identifier. All or a portion of the processing system is preferably local to the sampling system, but can alternatively be remote (e.g., a remote computing system), distributed between the local and remote system, distributed between multiple local systems, distributed between multiple sampling systems, and/or otherwise configured. The processing system preferably includes one or more processors (e.g., CPU, GPU, TPU, microprocessors, etc.), configured to execute all or a portion of the method and/or modules. The processing system can optionally include memory (e.g., RAM, flash memory, etc.) or other nonvolatile computer medium configured to store instructions for method execution, repositories, and/or other data.

When the processing system is remote or distributed, the system can optionally include one or more communication modules, such as long-range communication modules (e.g., cellular, internet, Wi-Fi, etc.), short range communication modules (e.g., Bluetooth, Zigbee, etc.), local area network modules (e.g., coaxial cable, Ethernet, WiFi, etc.), and/or other communication modules.

The processing system can include one or more modules, wherein each module can be specific to a method process, or perform multiple method processes. The modules for a given method instance can be executed in parallel, in series, or in any suitable order. The modules for multiple method instances can be executed in parallel, in batches, in sequence (e.g., scheduled), or in any suitable order. The modules can include classifiers, feature extractors, pre-processing, or any other suitable process. When multiple items appear in an image, different instances can be executed for each item; alternatively, a single instance can be executed for the plurality of items. The modules are preferably shared across all local systems within a local cluster (e.g., sampling systems within a predetermined geographic location of each other, sampling systems connected to a common LAN, sampling systems associated with a common user account, etc.), but can alternatively be specific to a given sampling system.

The modules can include an input encoding module, a comparison module, and/or any other suitable module.

The input encoding module functions to determine an item encoding for an image (e.g., reduce the dimension of the image into a feature vector). The input encoding module preferably includes one or more classifiers (e.g., item classifiers, shape classifiers, combination classifiers, count classifiers, or any other suitable classifier), but can additionally or alternatively include one or more autoencoders, algorithms, and/or other analysis methods.

The input encoding module can include one or more classifiers that are specific to: each sensor of the sampling system (e.g., camera, feed, etc.), each image, each geometry or geometric model, each pose, each location within the housing, each view of the measurement volume, and/or per other system parameter. Additionally or alternatively, the same classifier can be shared across multiple cameras and/or inputs. For example, for each input, a single instance of the same classifier can be used to process each input serially, multiple instances of the same classifier (e.g., item classifier) can be used to process each input in parallel, and/or multiple instances of different classifiers can be used to process each input in parallel, however, the input can be otherwise processed.

Each classifier preferably includes an architecture that includes at least an intermediate layer and an output layer. The intermediate layer preferably outputs feature values in a feature vector (e.g., an encoding representative of the item or image), but can alternatively output any other suitable data. The output layer can ingest the feature values (output by the intermediate layer) and can output: item classes, probabilities for each of a set of predetermined items, a binary output (e.g., for a given item class), or any other suitable output. Each item class can be represented by a respective node of the output layer. The dimension of the output layer can be equal to the number of item classes. The output layer can be dynamic if the number of item classes increase or decreases. However, the classifier can be otherwise constructed.

Each classifier is preferably a multiclass classifier, but can alternatively be a binary classifier or other classifier. Each classifier can be a neural network (e.g., feed forward, CNN, RNN, DNN, autoencoder, or any other suitable network), a regression (e.g., logistic regression), a feature extractor (e.g., PCA, LDA), autoencoders (e.g., autoencoder classifier), logistic regression classifiers, and/or be any other suitable classifier or algorithm. In a one variation, each of the classifiers is a ResNet.

The classifiers are preferably trained to output an item identifier associated with an item class given a set of input images, but can alternatively be trained to output a probability for each of a predetermined set of items, output a feature vector, or otherwise trained. The classifiers are preferably trained once (e.g., before deployment), and not retrained after deployment; however, the classifiers can be periodically retrained (e.g., in parallel with runtime), retrained upon occurrence of a training event (e.g., a threshold number or rate of misidentified items are detected), and/or at any other suitable time. The classifiers are preferably trained using supervised learning on a training dataset, but can be trained using few-shot learning, unsupervised learning, or other techniques. In variants, each classifier is trained with the data associated with the training repository, but the data can be associated with the item repository or any other suitable repository. When the classifiers are input-specific, the classifier is preferably trained on the corresponding input(s) from the training repository (e.g., a right-front classifier is trained on images sampled from the right-front point of view, a height map classifier is trained on height maps, etc.), but can be otherwise trained.

In one variation, the classifiers are pre-trained and tuned (e.g., using a training dataset). In a second variation, the classifiers are pre-trained (e.g., on a similar or disparate dataset) and untuned. In a third variation, untrained classifiers are newly trained on the training dataset. In this variation, classifier can be initialized with a predetermined set of weights (e.g., random initialization, He initialization, Xavier initialization, zero initialization such as for biases; or any other suitable initialization), the classifier can be initialized with transfer learning (e.g., using the weights determined from a related task). For example, the weights could be initialized with those associated with ImageNet or any other suitable item identification task. However, the classifiers can be otherwise trained.

The input encoding module preferably includes a cascade of classifiers, but can alternatively include an ensemble of classifiers, be a single classifier, or be any other suitable combination of analysis methods.

The input encoding module can include a first set of classifiers followed by a second set of classifiers, wherein the successive classifier set (e.g., second set of classifiers) ingests data extracted from the prior classifier set (e.g., first set of classifiers). However, the input encoding module can include any number of classifier sets, arranged in any suitable configuration. In a specific example, the classifiers in the first set convert each input image (e.g., image segment, full image, etc.) into an image encoding (e.g., feature vector), while the classifiers of the second classifier set ingests the image encodings output by the first set and output a single item encoding. Both the first and second sets can optionally output item classifications as well, which can be used to verify the item identified by the comparison module, discarded, used to train the respective classifier (e.g., wherein the comparison module's output is used as the source of truth), or otherwise used.

The classifiers of the first set are preferably all the same (e.g., the item classifier), but can alternatively be different. The second set preferably includes a single classifier (e.g., combination classifier), but can alternatively include multiple classifiers. However, the input encoding module can additionally or alternatively include any other suitable classifiers.

The extracted data from each classifier is preferably an encoding. The encoding is preferably a feature vector associated with an intermediate layer (e.g., output by the intermediate layer, represented in the intermediate layer, etc.; example shown in FIG. 4). The intermediate layer is preferably the second to last layer of the classifier, but can be the third to last layer, a layer before the last layer (e.g., before a SoftMax layer, before a normalization layer, etc.), or any other suitable layer.

The input encoding module can include an item classifier, a combination classifier, auxiliary classifiers (e.g., a shape classifier, a count classifier, etc.), and/or any other suitable classifier.

The item classifier preferably functions to identify an item (e.g., from a predetermined set of items) given an input. The item classifier preferably ingests images (e.g., full frame, image segments, etc.), but can additionally or alternatively ingest descriptions of items, image segments, point clouds, or any other suitable input data. One or more intermediate layers of the item classifier can output an item encoding, wherein the item encoding can be used by other system components. The output layer of the item classifier preferably outputs a respective item identifier (e.g., from a set of item identifiers) for the associated input, but can additionally or alternatively output an input encoding, a probability for each of a set of item identifiers, or any other suitable information. In one example, the item classifier can include a convolutional neural network (CNN), wherein the CNN can be trained to determine item identifier probabilities for each item in S100 (e.g., wherein the output layer of the CNN corresponds to item identifiers). However, item classifier can be a feed forward neural network, a fully connected neural network, partially connected neural network, a fully connected network with the last M layers removed, and/or be otherwise constructed. The item classifier is preferably part of the first set of classifiers, but can alternatively be part of the second set or any other suitable set.

In a first variation of the input encoding module, different instances of the same item classifier are used to process the outputs of each sensor.

In a second variation of the input encoding module, a different item classifier is trained and deployed for each pose relative to the examination space (e.g., each sensor), wherein each item classifier is trained on labeled images, sampled from the respective pose's perspective, of each of a given set of items.

The combination classifier functions to identify an item (e.g., from a set of predetermined items) based on an input vector. The combination classifier is preferably part of the second set of classifiers, but can alternatively be part of the first set or any other suitable set. The combination classifier is preferably a feed forward neural network as shown in FIG. 4, but can additionally or alternatively be a fully connected neural network, partially connected neural network, a fully connected network with the last X layers removed, CNN, RNN, any other suitable neural network, logistic regression, or any other suitable classifier. The combination classifier can be trained to determine item identifier probabilities based on the input vector (e.g., wherein the output layer of the combination classifier is associated with item identifiers), but can alternatively be trained to output an item encoding and/or any other suitable output. In a specific example, the combination classifier can process the input vector to produce a second encoding with a predetermined dimensionality (e.g., 100, 256, 512, 1024, etc.).

The input vector is preferably a combined input vector, generated from the input encodings from the item classifier(s) and/or auxiliary module(s), but can alternatively be otherwise determined. The input encodings are preferably concatenated together (e.g., based on sensor pose, item pose, randomly, etc.; into a 1×N vector, in parallel, etc.), but can alternatively be multiplied, summed, or otherwise combined. Alternatively, the combination classifier can accept multiple input encodings (e.g., include multiple input channels).

The input encoding module can optionally include auxiliary modules, which function to augment the system accuracy and/or disambiguate between different items having similar visual characteristics. Examples of items having similar visual characteristics include: different sizes of the same product line (e.g., e.g., a 150 ml Coke™ can vs. 160 ml Coke™ can), different packaging combinations of the same item (e.g., 6 single cans vs. a 6-pack of cans), and/or other characteristics.

The auxiliary modules can include: a shape module, a count module, a physical distribution module, and/or any other suitable module. The auxiliary modules are preferably part of the first set of classifiers, but can alternatively be part of the second set or any other suitable set. The auxiliary modules can ingest the same information (e.g., RGB images) or different information (e.g., 3D point cloud, height maps, depth maps, etc.) from the item classifier. The auxiliary modules are preferably classifiers, but can alternatively be sensor modules or other modules. The auxiliary classifiers are preferably trained to identify the item (e.g., output an item classification), wherein an auxiliary encoding (e.g., feature vector) can be extracted from an intermediate layer, but can be trained to output the auxiliary encoding, or otherwise trained. The auxiliary modules are preferably executed in parallel with the image classifier (e.g., as part of the first set of classifiers), but can alternatively be executed after the image classifier (e.g., ingest image classifier outputs), or executed at any other suitable time. The auxiliary module output can be used as an input to the second set of classifiers, to disambiguate candidate items identified by the comparison module, to limit the set of candidate items considered by the comparison module, and/or otherwise used.

The auxiliary modules can include: a shape module, a count module, a physical distribution module, and/or any other suitable module configured to determine any other suitable parameter of the item or set of items within the measurement volume.

The shape classifier preferably functions to convert a geometric representation input (e.g., height map, binary mask, point cloud, depth map, mesh, hull, etc.) into a shape encoding (e.g., shape feature vector). The geometric representation can be from a predetermined viewpoint, such as top down, side, back, isometric top front, isometric top back, and/or from any other suitable viewpoint. The geometric representation can be determined from a set of images (e.g., stereoscopic image) associated with an item, the range data associated with the item (e.g., structured light measurements), and/or from any other suitable data. The shape classifier preferably outputs a respective item identifier for the associated image, but can additionally or alternatively output an input encoding, or any other suitable information. The shape classifier can be additionally trained on one image and/or a plurality of images per item, one geometric representation and/or a plurality of geometric representations per item, per a plurality of items, etc.; a transformation or combination of one or more images and/or one or more geometric representations; or otherwise trained. Each of the plurality of images and/or geometric representations can depict a different point of view (e.g., side, front, isometric, back, top, etc.) or the same point of view. The shape classifier can be trained on labeled set of the item's geometry from the respective geometry point of view and/or otherwise trained.

The count classifier preferably functions to determine the number of items in a scene based on visual information (e.g., image, image segment, etc.). The count classifier can be combined with the item classifier (e.g., as an additional output), and/or be separate. The count classifier is preferably a CNN, but can additionally or alternatively be a feed forward neural network, or any other suitable neural network. The output of the count classifier can be used in S500 to determine the total for the transaction, in S400 to determine the second encoding, and/or otherwise used. The count classifier can be trained using images from the training repository (e.g., to determine the number of items in each image) or any other suitable images from any other repository. However, the count classifier can additionally or alternatively be otherwise defined.

The physical distribution module functions to determine the physical distribution of the items within the measurement volume. In a first variation, the physical distribution module includes a weight sensor array (e.g., in the base) that determines the item distribution based on the weight distribution. In a second variation, the physical distribution module can be a classifier that determines the physical distribution (e.g., clustering, placement, etc.) from a set of images (e.g., the top down image). However, the physical distribution module can be otherwise constructed.

The comparison module of the processing system functions to identify the item based on a comparison with the item repository. For example, the comparison module can compare the item encoding for the unknown item with encodings for a set of known items, wherein the unknown item is identified as the known item with the most similar encoding. The comparison module preferably identifies the item based on one or more encodings from the input encoding module (e.g., from the combination classifier, from the input classifier, etc.), but can alternatively identify the item based on any other suitable feature vector, image, image segment, or other suitable data representation.

The comparison module is preferably a clustering algorithm, more preferably k-nearest neighbors algorithm (e.g., with distance measurement: Euclidean distance, cosine distance, dot product, etc.), but can additionally or alternatively use mean-shift clustering, EM clustering using GMM, locality-sensitive hashing, or any other suitable clustering algorithm. Additionally or alternatively, the comparison module can execute a proximity search between the encoding vector and the known vectors for items within the item repository (e.g., using nearest neighbors, k-nearest neighbors, approximate nearest neighbor, nearest neighbor distance ratios, fixed-radius near neighbors, linear search, space-partitioning methods, KD trees, etc.), determine a proximity or distance score (e.g., using cosine similarity, dot product, etc.), or otherwise compare the unknown item's encoding vector with known items' encoding vectors.

The unknown item's encoding vector can be compared to the known items' encoding vector in a pairwise manner, in a batched manner, in parallel, in series, and/or in any other suitable order. The unknown item's encoding vector can be compared to all known items' encoding vector, a subset of the known items (e.g., limited by the auxiliary module's output, limited by merchant preferences, limited by the items' associated "in-stock" status, etc.), and/or any other suitable set of known items encoding vectors. The known items are preferably limited to those associated with a specific merchant (e.g., items within the merchant's item repository), but can additionally or alternatively be associated with any merchant associated with the system, all items with a SKU, all items associated with a platform, and/or any other suitable set of items. In this variant, the unknown item can be identified as the item with the closest known encoding vector, or otherwise determined. The comparison module can additionally or alternatively be a neural network, a regression, or any other suitable method that determines an item class. However, the comparison module can be otherwise configured.

In a first variation, the comparison module determines the item identifier with k-nearest neighbors using Euclidean distance metric. K-nearest neighbors determines a comparison between the input feature vector (e.g., encoding vector) and known item encodings from the item repository.

In a second variation of the comparison module determines the item identifier with a neural network (e.g., a feed forward neural network). The output layer corresponds to a set of item identifiers (e.g., based on merchant/entity preferences, or otherwise based). The input can be the encoding vector from the combination classifier, or any other suitable feature vector. The neural network can be trained using the training data associated with the training repository, the item data associated with the item repository, or be otherwise trained.

Figure 2:
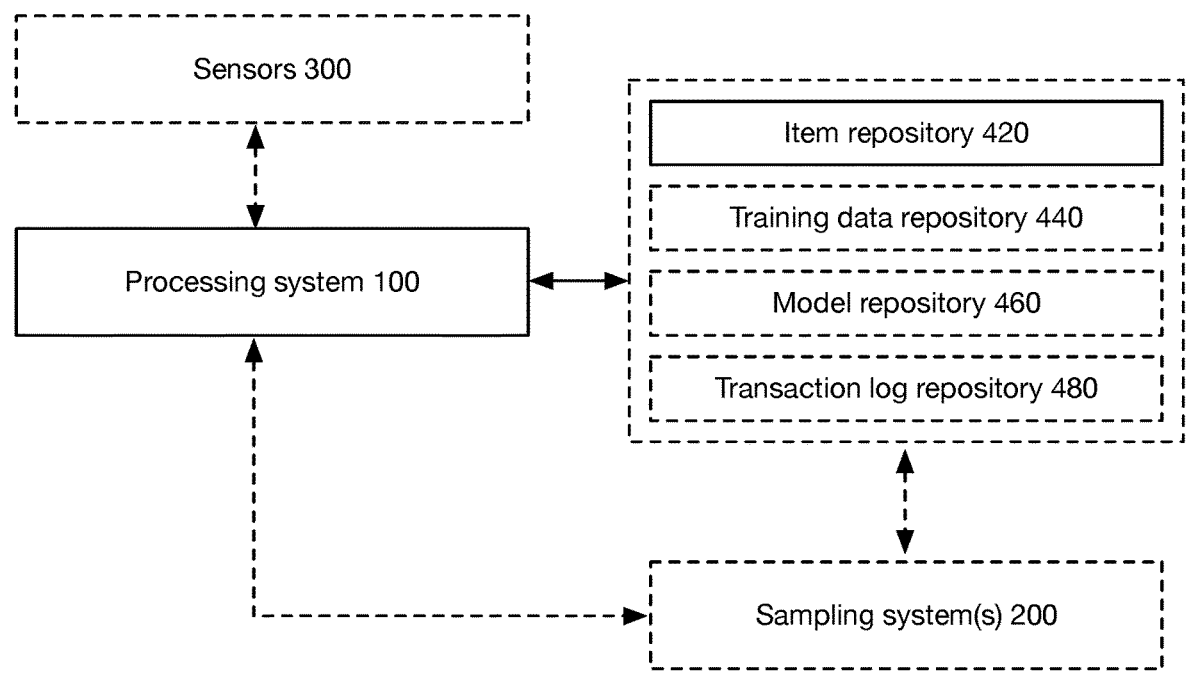
FIG. 2 is a schematic representation of the system.

The system preferably includes one or more repositories, as shown in FIG. 2. The repositories can include one or more item repositories 420, training data repositories 440, model repositories 460 (e.g., parameters learned from neural networks, regressions, machine learning tools, etc.), transaction log repositories 480, merchant preferences repositories, image data repositories, image metadata repositories, or any other suitable set of repositories. The repositories can be stored in the computer readable media, separate from the computer readable media, or be otherwise stored.

The item repository preferably functions to store item information for one or more items. Item information can include: an item representation (e.g., item encoding, image, etc.), the associated item class (e.g., item identifier), item price, item SKU, number of items stocked, item auxiliary parameter (e.g., item size, item packaging, etc.) and/or encoding thereof (e.g., output by an auxiliary module), purchase history, and/or other information. The item repository is preferably stored on the local system, but could additionally or alternatively be stored on the remote computing system, in a separate system (e.g., connected via the LAN), or in any other suitable system. The item repository can be shared between processing systems, local to a processing system, stored in computer readable memory that can be accessed by both the processing system and the remote computing system, or be otherwise stored. The item repository can be specific to a merchant, entirely or partially shared between merchants, not shared between merchants, or otherwise shared.

The item representation can be stored in the item repository using a hash function (e.g., RIPEMD, Tiger, xxhash, etc.), stored based on encoding similarity, auxiliary parameter value (e.g., by size, by packaging, etc.), randomly stored, alphabetically stored, and/or otherwise stored. The item encoding can be stored near encodings of the same cluster (e.g., such as determined by the comparison module), and/or based on any other suitable criteria. However, the item representation can additionally or alternatively be otherwise stored in the item repository.

The training repository preferably includes training data. The training data is preferably a representative dataset (e.g., a predetermined set of item classes that are each identified by an item identifier are represented in the dataset such as 500 classes, 10,000 classes, etc.) of the items to be identified during runtime, but can be any other suitable data. The dataset is preferably large (e.g., 1 million samples, 14 million samples, etc.), but can additionally be a small data set (e.g., 1000 samples, 10,000 samples, 500,000 samples), or any other suitably sized dataset. The dataset can contain items disparate from transaction items (e.g., wherein transaction items can be items associated with a specific merchant), items non-disparate in comparison to the transaction items, or any combination of disparate and/or non-disparate items. The training data is preferably a large representative dataset with a wide variety of items (e.g., large kurtosis, large standard deviation(s); include packaged goods, baked goods, and fresh produce, etc.), but can additionally or alternatively include similar items only. The dataset can contain data from the imaging system, the item repository (e.g., the encodings, the images, the item classes, etc.), and/or another source. The data can be sampled from one or more poses, from one or more perspectives, occluded (e.g., partially), or be otherwise sampled. The training repository can be shared between processing systems, local to a processing system, stored in computer readable memory that can be accessed by both the processing system and the remote computing system, or be otherwise stored or not stored.

The training dataset preferably includes images of a plurality of items from various viewpoints, each labelled with the respective item identifier. The images can be full frame images, image segments, and/or other images. The images can be RGB images, depth images, and/or other images. The training dataset can include at least a minimum number of items (e.g., 4,000, 12,000, etc.), a minimum number of items sharing a common visual parameter (e.g., packaging, branding, color, shape, size, etc.), and/or be otherwise constructed. The viewpoints preferably include at least one view of each side or pose of the item (e.g., left, right, top, bottom, front, back, isometric, etc.), but can include less views. The training dataset can be real data (e.g., sampled during runtime, during data collection), simulated data (e.g., partially obfuscating views, introducing noise into the images, etc.), and/or other data. The labels can be: manually entered by a trainer, manually entered by a user (e.g., during runtime), and/or otherwise associated with the images.

However, the system 20 can additionally or alternatively include any other suitable components.

5. Method

The method for item identification preferably includes determining visual information for an item S100; calculating a first encoding using the visual information S200; calculating a second encoding using the first encoding S300; determining an item identifier for the item using the second encoding S400; optionally presenting information associated with the item to a user S500; and optionally registering a new item Shoo. The method is preferably performed by the system disclosed above, but can be performed by any other suitable system.

Figure 3:
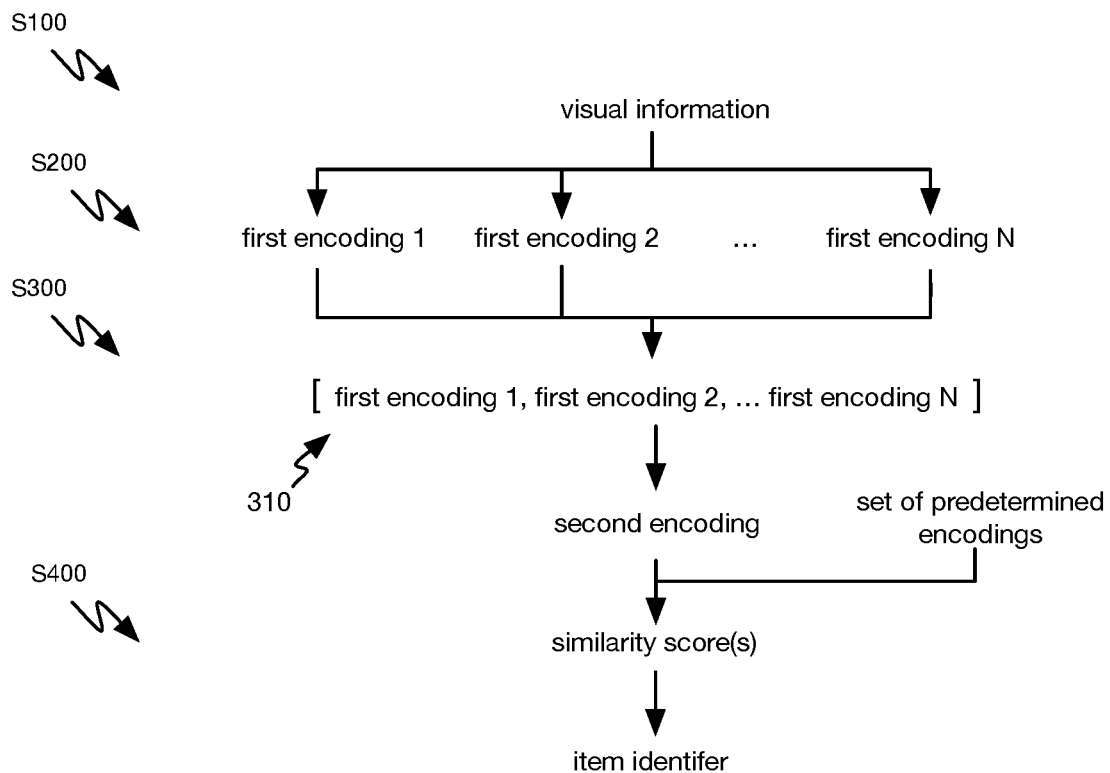
FIG. 3 is an embodiment of the method.

The method functions to determine a feature vector (e.g., encoding of the visual information) and associate the feature vector with an item identifier (e.g., as shown in FIG. 3). In variants, an item can be accurately and quickly identified based on the item encoding determined from a set of color images, rather than a set of color images themselves. In another variant, an unknown item's identifier is not directly determined by the combination classifier, but instead determined based on an intermediate layer of the classification classier. The intermediate layer can output a feature vector that is compared to other feature vectors, by the comparison module, to determine the unknown item's identifier.

The method is preferably performed during an active session, but can additionally or alternatively be performed during any other suitable time. Examples of active sessions include: adding a new item, during a transaction (e.g., while a user is attempting to check out or purchase an item), during a training session, or during any other suitable operation.

All elements or a subset of elements of the method are preferably performed by the system described above, but can additionally or alternatively be performed by any other suitable component or system.

Determining visual information for an item S100 can function to determine visual information (e.g., images, image segments, height maps, etc.) for subsequent item identification. The item is preferably unknown (e.g., during runtime, during transactions, etc.), but can alternatively be known (e.g., during new item addition, training, etc.). The visual information can be captured by an imaging system, received from an imaging system, and/or otherwise determined. The visual information is preferably concurrently sampled (e.g., at the same time, at substantially the same time, within a predetermined time difference), contemporaneously sampled, sampled at different times, and/or sampled at any other suitable time. The visual information is preferably of the same item instance and/or same set of items, but can alternatively be of different items. The visual information can include one image (e.g. a new item image), a plurality of images (e.g., plurality depicting the item each from a different point of view such as top, back, side, etc.), a plurality of image segments of an item (e.g., determined from a plurality of images, using instance-based segmentation, semantic segmentation, or other segmentation technique), a height map (e.g., top view of the item, side view of the item, etc.), and/or any other suitable information. When plurality of images is used, the plurality of images preferably cooperatively encompass a minimum extent of the measurement volume and/or item (e.g., at least 20%, 30%, 40%, 50% 60% 70% 80%, 90%, etc. of the lateral extent, vertical extent, circumference, overall surface area, etc.), but can alternatively encompass any suitable extent of the measurement volume and/or item. The plurality of images can include at least a minimum number of images of the measurement volume and/or item (e.g., 1, 2, 4, 8, 10, 16, etc.) from at least a minimum number of different angles (e.g., at least one side and the top; any combination of the top, bottom, left, right, front, and/or back, etc.), but can include any other suitable number of images sampled from any suitable point of view.

In a first variant, the visual information can include images which can be used as input in S200 (e.g., as input to the item classifier to determine the first encoding).

In a second variant, S100 can include generating item segments from the visual information for each image by isolating the view of the item from the rest of the image. The item segments can be used as input in S200 to determine the first encodings.

However, the visual information can be otherwise determined.

Calculating a first encoding using the visual information S200 can function to reduce the dimensionality of the visual information. The first encoding can be calculated by the input encoding module (e.g., using the one or more classifiers based on the visual information). The first encoding is preferably calculated by the item classifier, but can be calculated by any other suitable module. The first encoding can be calculated: for each individual visual element (e.g., for each image, height map, etc.) of the visual information (e.g., using individual classifiers), for all visual elements as a batch (e.g., using a single classifier, wherein the classifier can include a different channel for each visual element), and/or for any combination of visual elements. In a first example, the visual information can include a single image, which is then used to determine the first encoding. In a second example, when the visual information includes a plurality of images, copies of the item classifier are used to determine multiple first encodings. In a third example, when the visual information includes a height map, the shape classifier is used to determine an additional first encoding for the item's shape. In a fourth example, the count classifier is used to determine one or more item counts based on the visual information (e.g., total item count, item count per item identifier, etc.).

The classifiers can compute the individual first encodings in parallel (e.g., using copies of the item classifier, shape classifier, etc.) and/or in series (e.g., using the same classifier for each input).

S200 preferably outputs a set of encodings (e.g., N encodings for N visual elements), but can alternatively output a single encoding (e.g., a single encoding including the N encodings, etc.). The first encodings are preferably the feature values from an intermediate layer of a classifier of the input encoding module (e.g., second to last layer, third to last layer, layer before a SoftMax layer, autoencoder output, etc.; example as shown in FIG. 4), or be any other suitable representation.

In a first variation, S200 includes, for each of a set of visual elements: identifying an item, from the respective visual element, using the item classifier; and extracting an encoding, output by an intermediate layer of the item classifier, as the first encoding for the visual element.

In a second variation, S200 includes: executing the item classifier for each of a set of visual elements, halting execution at a predetermined intermediate layer of the item classifier, and storing the output of the predetermined intermediate layer as the first encoding for the respective visual element.

In an illustrative example, the visual information includes a set of 8 image segments (e.g., captured by the stereocameras). The image segments can be processed through different instances of the item classifier to obtain respective first encodings, but can additionally or alternatively be processed sequentially through the same instance of the item classifier.

Figure 5:
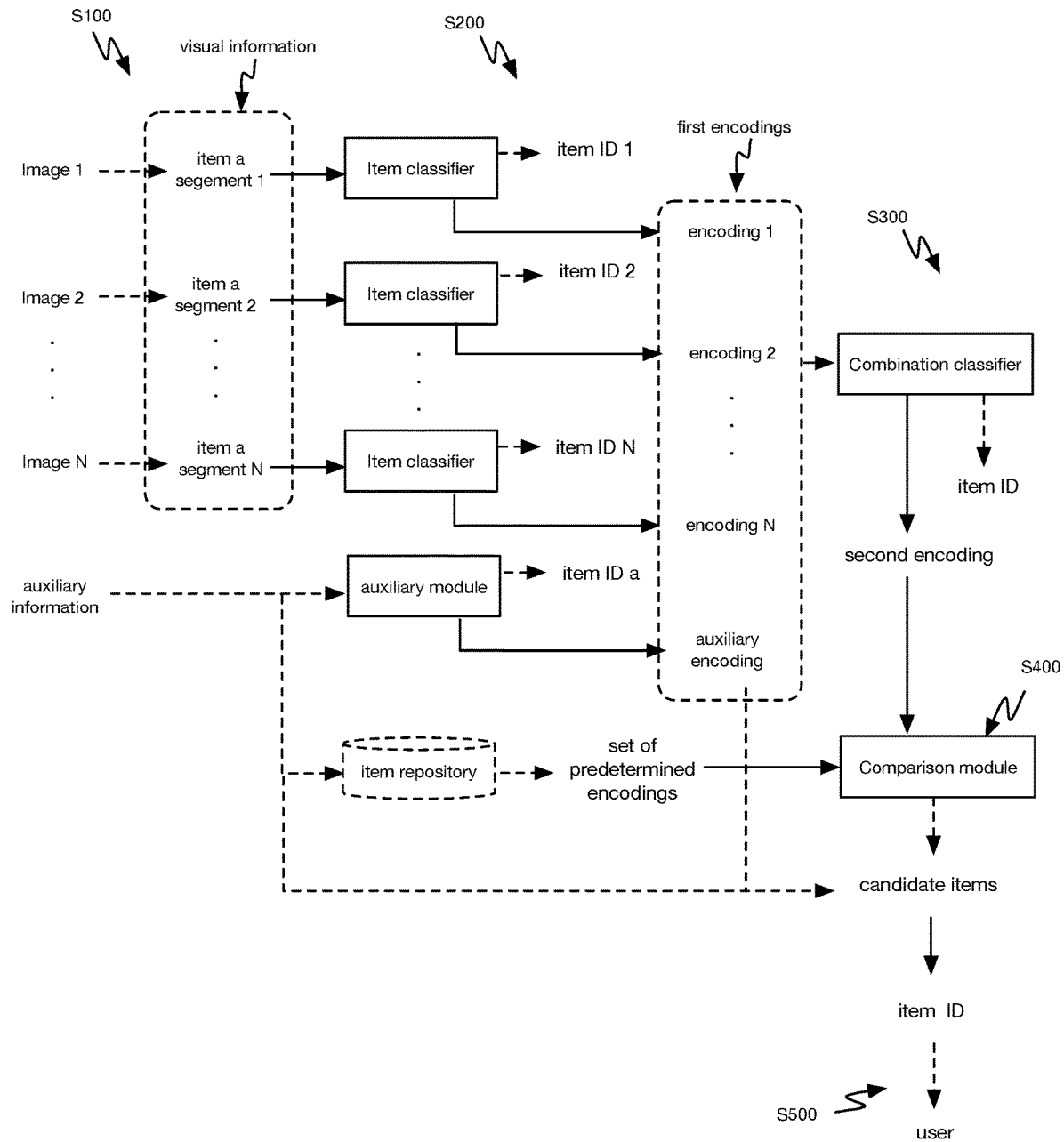
FIG. 5 depicts an embodiment of the method.

In a second illustrative example, the visual information can additionally include a height map (e.g., cooperatively generated from the depth sensor and the stereocameras). The height map can be processed through an instance of the shape classifier to obtain a respective shape encoding (e.g., additional first encoding). The item classifier instances and the shape classifier instance can be processed in parallel. The output is for each input a respective encoding (e.g., an item encoding, shape encoding) or any other suitable feature vector (e.g., as shown in FIG. 5).

However, the first encoding(s) can be otherwise determined.

Calculating a second encoding using the first encoding S300 can function to determine a more accurate item representation. S300 can include: optionally combining the first encodings output by S200; providing the (combined) first encodings to the second classifier set of the input encoding module (e.g., the combination classifier); and determining the second encoding from the second classifier set. The determined second encoding can optionally be stored in a transaction log repository, item repository, or otherwise stored.

Combining the first encodings functions to generate an input vector for the second classifier set. The one or more first encodings can be combined by concatenating the first encodings (e.g., in series, based on a predetermined order, etc.) to form a combined input vector 310. The concatenation order can be a predetermined sensor order, pose order, random order, and/or any other suitable order. However, the first encodings can be summed, multiplied, combined as a matrix, otherwise combined into a single input, or not combined into a single input. The first encodings used in S200 can include: a single first encoding (e.g., when a single RGB image is available), multiple different first encodings from S200 (e.g., when multiple images are available), first shape encoding (e.g., when a heightmap is available, when the combination classifier is trained on a shape encoding input, etc.), an item count (e.g., when a counting module is used), and/or any other suitable information.

The combined input vector 310 can be provided to as an input to the second classifier set. The second classifier set preferably includes a single instance of the combination classifier, but can include any other suitable number of instances of any classifier. Alternatively, the first encodings can be directly provided to the second classifier set (e.g., wherein the combination classifier can include a different input channel for each encoding). However, the first encodings can be otherwise fed to the classifiers of the second classifier set.

Determining the second encoding functions to determine an encoding that is highly representative of the unknown item (e.g., determined based on one or more item encodings, generated from one or more views of the unknown item). The second encoding can be: output from an intermediate layer (e.g., second to last layer, third to last layer, layer before a SoftMax layer, etc.) of the second classifier (e.g., the combination classifier), output by the last layer of the second classifier, be an intermediate layer of the second classifier, or otherwise determined. The second encoding is preferably a feature vector (e.g., vector of feature values), but can alternatively be a matrix or other representation. The second encoding preferably includes 512 values, but can additionally or alternatively include less than 100, more than 100, more than 256, more than 500, more than woo, and/or any other suitable number of values.

In a first variation, determining the second encoding can include: identifying the item, based on the first encodings, using the combination classifier; and extracting an encoding output by an intermediate layer of the combination classifier as the second encoding.

In a second variation, determining the second encoding can include: executing the combination classifier until a predetermined intermediate layer, storing the output as the second encoding, and halting further inference.

However, the second encoding can be otherwise determined or calculated.

Determining an item identifier for the item using the second encoding S400 can function to determine an item identifier for the item depicted in the visual information. The item identifier is preferably a sequence of characters (e.g., letters, digits, symbols, etc.) used to identify or refer to an item. The item identifier can be unique per item class (e.g., type of pizza, type of tea, type of ice cream, etc.), but can additionally or alternatively be unique per item type (e.g., pizza, tea, ice cream, etc.), and/or otherwise unique. The item identifier is preferably associated with a predetermined encoding stored within the item repository, but can be any other suitable identifier.

The item identifier is preferably determined using the comparison module, but can additionally or alternatively be determined using one or more classifiers of the input encoding module or by any other suitable component.

The item identifier is preferably determined by comparing the second encoding to a set of predetermined encodings, and identifying the unknown item based on an encoding similarity with a known item associated with the item identifier.

Comparing the second encoding to a set of predetermined encodings functions to evaluate the encoding similarity. The set of predetermined encodings can be: all of the encodings in the item repository, a subset of the encodings (e.g., the closest cluster of encodings, encodings for items sharing an auxiliary parameter with the unknown item, etc.), and/or any other combination of encodings. The comparison between the second encoding and each predetermined encoding of the set can be performed: serially, in parallel, iteratively, or in any other suitable order. The comparison can be determined by: calculating a similarity score (e.g., a distance metric, such as Euclidean distance, cosine distance, etc.), calculating a difference, matching the second encoding with a predetermined encoding, clustering the second encoding with a predetermined cluster, hashing the second encoding and clustering the hash, and/or otherwise comparing the second encoding.

The item identifier determined for the unknown item is preferably the item identifier associated with the predetermined encoding that is the most similar to the second encoding, but can alternatively be the item identifier associated with another encoding, or be otherwise determined. The most similar predetermined encoding can be the predetermined encoding with the highest similarity score, the smallest distance, and/or any other suitable predetermined encoding.

In a first variant, S400, can include calculating a distance metric (e.g., Euclidean distance, cosine distance, etc.) between the second encoding and the set of predetermined encodings, and using the item identifier associated with the predetermined encoding with the smallest similarity score as the item identifier for the unknown item.

In a second variant, S400, can include using KNN of the comparison module to determine a cluster for the second encoding, and using an item identifier associated with the cluster as the item identifier for the item.

In a third variant, S400 can include using any suitable algorithm of the comparison module to determine a similar encoding to the second encoding and using the item identifier of the similar encoding as the item encoding.

However, the item identifier can be otherwise determined. The determined item identifier can optionally be stored in a transaction log repository (e.g., in association with a user account, merchant identifier, local system identifier, timestamp, visual elements, and/or other data), item repository, or otherwise stored.

Figure 6:
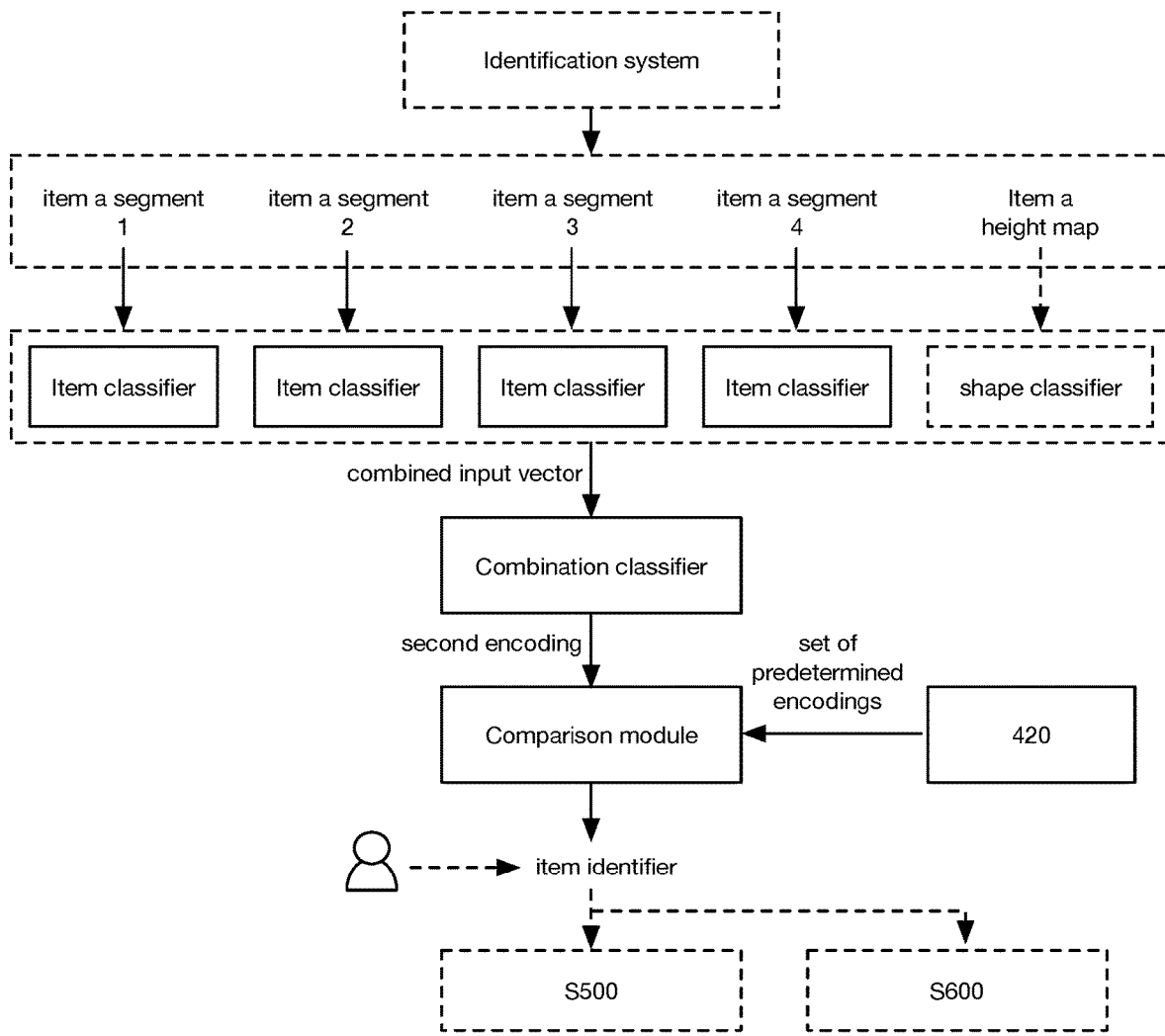
FIG. 6 depicts an embodiment of the method.

The method can optionally include disambiguating between similar-looking items with auxiliary parameters (example shown in FIG. 6). This can be performed: every run, when the second encoding does not match a single predetermined encoding (e.g., does not map to a single item identifier), when the second encoding is similar to multiple predetermined encodings, or upon satisfaction of any other suitable condition.

In a first variant, the method includes receiving auxiliary information for the item (e.g., shape information, count information, packaging information), and using the auxiliary information to select an item from a set of candidate items (e.g., wherein the second encodings map to, or substantially match, the secondary encodings associated with each candidate item). In this variation, the candidate items can be associated with auxiliary parameters (e.g., shape information, count information, packaging information, etc.). In one example, the secondary encoding and predetermined encodings can represent an unsealed item appearance, wherein the secondary encoding can substantially match a plurality of candidate encodings, each associated with a different item. The auxiliary information (e.g., size information, count information, packaging information, etc.) for the unknown item can then be compared to the predetermined auxiliary information associated with each of the candidate encodings, wherein the item identifier associated with the predetermined auxiliary information substantially matching the unknown item's auxiliary information can be selected as the unknown item's identifier.

In a second variation, the method does not use auxiliary information, wherein the item classifier(s) and combination classifier are trained on a dataset including objects with similar (or the same) appearance with different auxiliary parameters (e.g., size, scale, count, packaging, etc.).

In a third variation, the method includes receiving auxiliary information of the item or of a scene containing the item (e.g., the top view of an examination space, represented as a height map), and determining a first auxiliary encoding by providing the auxiliary information (or visual elements) to an auxiliary classifier that was trained to identify the item based on the auxiliary information (or visual elements), wherein the second encoding is further determined based on the first auxiliary encoding (e.g., the first shape encoding is provided as an input to the combination classifier along with the first image encodings). In this variation, the auxiliary classifier can include a CNN, wherein the CNN can be trained to determine item identifier probabilities based on the auxiliary information (e.g., a height map of the scene), or be any other suitable classifier. An example is depicted in FIG. 6. However, items can be otherwise disambiguated.

Presenting information associated with the item to a user S500 can function to provide the information to a user to complete a transaction (e.g., as part of a checkout, payment, or other transaction). The information can be retrieved from the item repository and/or any other repository using the item identifier. When multiple items were concurrently included within the measurement volume, information for the multiple items can be concurrently presented to the user (e.g., in a list, etc.); alternatively, the information can be otherwise presented.

In a first variant, the item identifier determined in S400 can be used to determine an item price which can be used to determine the total for the transaction.

In a second variant, the item count determined in S200 can be used to determine a total for the transaction.

However, information can be otherwise presented to the user.

Registering a new item S400 can function to enable recognition of new items in S400. A new item can be: an item outside of the initial item repository, an item outside of the predetermined item set used for training (e.g., outside of the training repository), an item that the item encoding module is not trained to recognize (e.g., the item classifier and combination classifier do not output an item identifier with high confidence; a threshold number of instances of the item classifier disagree on the item identifier; etc.), and/or otherwise new to the system.

New items can be registered (e.g., added to the item repository) in response to a detection of a new item event. The new item event can be: a user marking a presented item identifier for an item as incorrect, receipt of a new item addition input (e.g., selection of an "add new item" icon), all proximity scores being below a predetermined proximity threshold (e.g., the encoding vector being too far away from all known items' encoding vectors), item encoding module inability to classify the item (e.g., all item classes have below a threshold output probability; etc.), disagreement between a threshold number of classifier outputs (e.g., the item class output by the classifiers do not match), satisfaction of a predetermined number of retry processes (e.g., repeating the method on resegmented images, etc.), and/or any other suitable event or set of conditions. The new item event can be detected manually (e.g., by a user), automatically (e.g., by the system), and/or otherwise detected.

In a first variant, registering a new item can include adding the item to the item repository, which can include: receiving item information (e.g., item identifier, item price, item numerosity, etc.) for the new item (e.g., from a user, such as a customer or merchant employee; from an external database; etc.); and storing the item encoding with the received item information in the item repository. The item information can be received before or after second encoding determination. For example, a user can determine that an item is not correctly recognized during runtime, wherein the method asks the user, client, and/or operator for the item identifier. The method stores the item identifier with the associated encoding in the item repository, wherein the encoding can be determined from the transaction log data (e.g., transaction log data can be stored in the transaction log repository), determined by S100-S300, or otherwise determined.

In a second variant, registering a new item can include: capturing a new image of the new item (e.g., using S100), calculating a first encoding using the item classifier that receives the new image as input, wherein the first encoding is output from an intermediate layer of the item classifier (e.g., using S200), calculating a second encoding using the combination classifier that receives the different first encoding as input, wherein the second encoding is output from an intermediate layer of the combination classifier (e.g., using S300), determining a new item identifier (e.g., received from a user, operator, determined using the comparison module, etc.), and storing the second encoding with the new item identifier in the item repository (e.g., for use in S4oo).

Figure 7:
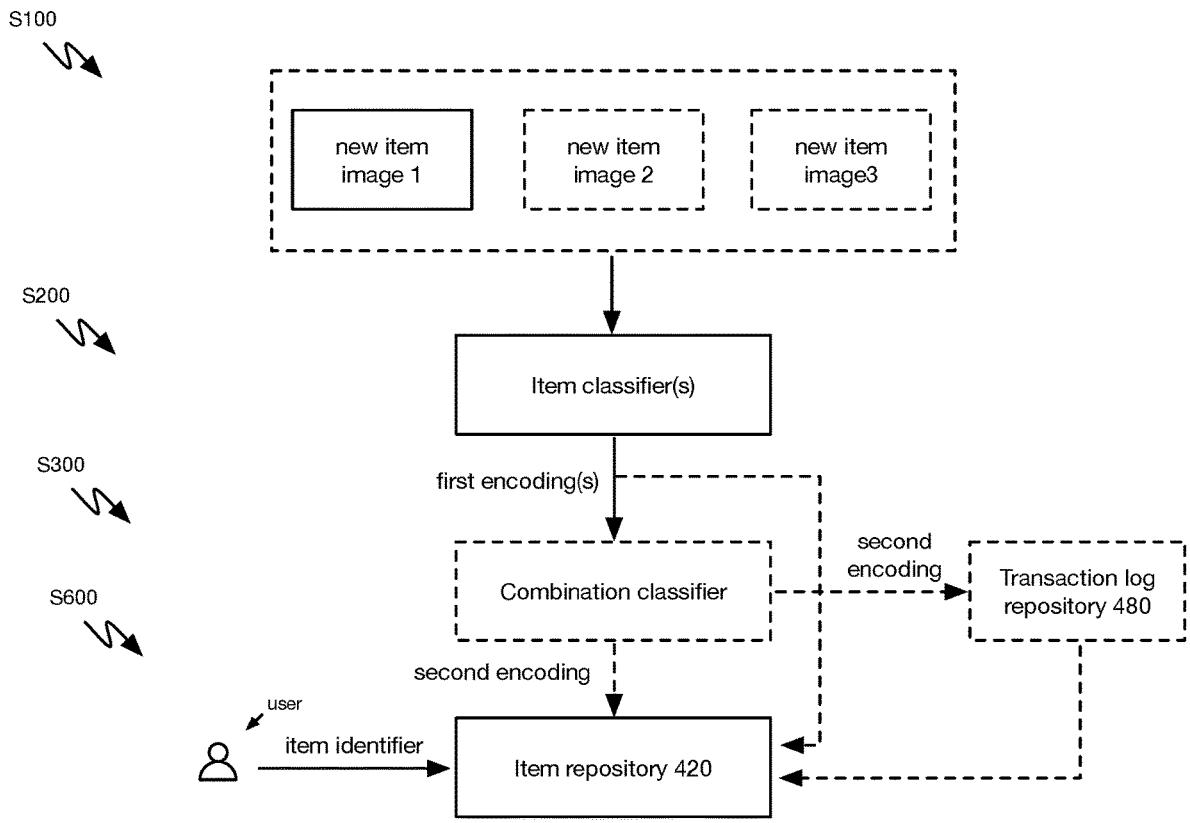
FIG. 7 depicts an embodiment of the method.

In a third variant, registering a new item can include capturing plurality of images of the new item, capturing a height map, and/or capturing any other suitable auxiliary information (e.g., using S100); determining a first encoding for each of the plurality of images using an item identifier and determining an additional first encoding for the height map using a shape classifier (e.g., using S200); combining (e.g., concatenating in series) the first encodings and the additional first encoding into a single combined input vector from which to determine a second encoding (e.g., using S300); using the second encoding as the item encoding for the new item; determining an item identifier for the new item; and storing the second encoding with the item identifier in the item repository (e.g., as depicted in FIG. 7).

In a fourth variant, registering a new item can include adding the item to the item repository, which can occur during and/or after a transaction. Adding the item can include capturing the visual information of the item, performing S200-S300 to determine the second encoding, storing the second encoding in the transaction log repository, and in response to a new item event (e.g., a user indicating incorrect item identification and correctly identifying the item with an item identifier), retrieving the second encoding from the transaction log repository and storing the second encoding and associated item identifier received from the user in the item repository.

However, the new item can be otherwise registered.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for item recognition, comprising:
capturing an image of an item;
calculating a first encoding based on the image using an item classifier, wherein the first encoding is output from an intermediate layer of the item classifier;
calculating a second encoding based on the first encoding using a combination classifier, wherein the second encoding is output from an intermediate layer of the combination classifier; and
determining an item identifier for the item based on a similarity between the second encoding and each of a set of predetermined encodings.

2. The method of claim 1, further comprising:
generating an item height map from the image; and
determining a shape encoding based on the item height map using a shape classifier;
wherein the second encoding is calculated based on the shape encoding.

3. The method of claim 1, wherein the similarity between the second encoding and each of a set of predetermined encodings is calculated using Euclidean distance.

4. The method of claim 1, wherein the item classifier is trained to determine an item identifier given an input image, and wherein the combination classifier is trained to determine an item identifier given a feature vector.

5. The method of claim 4, wherein an output layer of the item classifier corresponds to multiple item identifiers for different item types.

6. The method of claim 1, further comprising:
generating an item segment for the image by isolating the item from a remainder of the respective image; and
wherein the first encoding is calculated based on the item segments.

7. The method of claim 1, further comprising registering a new item, comprising:

capturing a new image of the new item;

calculating a new first encoding based on the new image and the item classifier, wherein the new first encoding is output from the intermediate layer of the item classifier;

calculating a new second encoding based on the new first encoding using the combination classifier, wherein the new second encoding is output from the intermediate layer of the combination classifier;

determining a new item identifier for the new item; and storing the different second encoding with the new item identifier.

8. The method of claim 1, further comprising:

generating an item count representation based on the image using a count classifier; and wherein the second encoding is determined based on the item count representation.

9. The method of claim 1, further comprising determining an item price for item purchase based on the item identifier.

10. The method of claim 1, further comprising:

capturing a plurality of images that each depict a different view of the item;

calculating multiple different first encodings in addition to the first encoding using the item classifier, wherein each of the multiple different first encodings is calculated using a different image of the plurality of images, and wherein each of the multiple different first encodings is output from the intermediate layer of the item classifier;

wherein the second encoding is calculated using the multiple different first encodings in addition to the first encoding.

11. A method for registering a new item for item recognition, comprising:

capturing an image of the new item;

calculating a first encoding based on the image using an item classifier, wherein the first encoding is output from an intermediate layer of the item classifier;

calculating a second encoding based on the first encoding using a combination classifier, wherein the second encoding is output from an intermediate layer of the combination classifier;

determining an item identifier for the new item; and storing the second encoding with the item identifier in an item repository.

12. The method of claim 11, further comprising, after registering the new item, using the second encoding and the plurality of other item encodings for item recognition, comprising:

capturing an image that depicts a view of an item;

calculating a different first encoding based on the image using the item classifier, wherein the different first encoding is output from the intermediate layer of the item classifier;

calculating a different second encoding based on the different first encoding using the combination classifier, wherein the different second encoding is output from the intermediate layer of the combination classifier; and determining an item identifier for the item based on a similarity between the different second encoding and a set of predetermined encodings, wherein the set of predetermined encodings includes the second encoding for the new item.

13. The method of claim 11, further comprising:

determining a height map of the new item; and determining a shape encoding, based on the height map, using a shape classifier; and wherein the second encoding is calculated based on the shape encoding.

14. The method of claim 11, wherein the second encoding is stored with the item identifier in the item repository in response to a new item event.

15. The method of claim 11, wherein the new item event is a receipt of an indication of an incorrect classification for the new item from a user.

16. The method of claim 15, further comprising, storing the second encoding in a transaction log repository, wherein storing the second encoding in the item repository comprises retrieving the second encoding from the transaction log repository.

17. The method of claim 11, further comprising:

capturing a plurality of images of the new item; and calculating a plurality of first encodings for each image of the plurality of images, wherein the first encodings are received as input to the combination classifier from which to determine the second encoding.

18. The method of claim 11, wherein the item classifier and the combination classifier are convolutional neural networks.

19. The method of claim 11, wherein the item classifier is trained to determine an item identifier based on an input image.

20. The method of claim 11, wherein the combination classifier is trained to determine an item identifier based on an input feature vector.

* * * * *